United States Patent [19]
Elixson

[11] Patent Number: 5,927,358
[45] Date of Patent: Jul. 27, 1999

[54] TREE LIMB REMOVING APPARATUS AND METHOD

[76] Inventor: Alfred Elixson, P.O. Box 32 Hi-way 18 W, Worthington, Fla. 32697

[21] Appl. No.: 09/118,763

[22] Filed: Jul. 18, 1998

[51] Int. Cl.⁶ .............................. B27L 1/00; A01G 23/06
[52] U.S. Cl. .................... 144/343; 144/24.13; 144/208.7
[58] Field of Search ................... 144/4.1, 24.13, 144/208.7, 347

[56] References Cited

U.S. PATENT DOCUMENTS

| | | | |
|---|---|---|---|
| 3,719,217 | 3/1973 | Bottoms | 144/24.13 |
| 3,948,299 | 4/1976 | Lafonge et al. | 144/24.13 |
| 4,172,478 | 10/1979 | Dakus | 144/24.13 |
| 4,371,016 | 2/1983 | Bradshaw | 144/24.13 |
| 5,094,281 | 3/1992 | Barnhill et al. | 144/24.13 |

*Primary Examiner*—W. Donald Bray
*Attorney, Agent, or Firm*—Steven R. Scott

[57] ABSTRACT

A tree limb removing apparatus and method featuring a tree delimbing device having a horizontal member with a plurality of vertical members perpendicular thereto and depending therefrom, which vertical members are preferably discs which are rotatable about said horizontal member, and the method of using such a delimbing apparatus to remove limbs from felled timber by orienting said horizontal member so that it is perpendicular to a felled tree to be delimbed and propelling said tree delimber along and over the length of said felled tree.

17 Claims, 2 Drawing Sheets

TREE LIMB REMOVING APPARATUS AND METHOD

BACKGROUND

1. Field of the Invention

The instant invention relates generally to the field of timber cutting and harvesting equipment and methods, and more specifically, to the field of methods/devices used in the timber industry for the delimbing of harvested trees. In particular, it involves a limb removing apparatus that can be driven over a stack of cut timber for the purpose of removing limbs therefrom.

2. Prior Art in the Field

Felled trees and logs must have the limbs removed therefrom prior to further processing. In the past, such trees have been individually delimbed by workmen with chainsaws. This method was and still is extremely dangerous. More recently, numerous attempts have been made to develop apparatus effective for this purpose. Representative examples of such prior art efforts may be seen in the following U.S. Patents:

1. U.S. Pat. No. 3,951,188 issued to Dawson in 1976 for a "Tree De-Limber."
2. U.S. Pat. No. 4,167,960 issued to Wildey in 1979 for a "Rail-Riding Limber and Topper."
3. U.S. Pat. No. 4,440,202 issued to Everett in 1984 for a "Tree Delimber."
4. U.S. Pat. No. 4,606,385 issued to Williamson in 1986 for a "Tree Limb Removing Apparatus."
5. U.S. Pat. No. 4,823,850 issued to Strean in 1989 for a "Pullthrough Delimbing Device."
6. U.S. Pat. No. 5,443,562 issued to Parks et al. for a "Tree Delimber."

Most of these patents describe large mobile apparatus, either individually powered or flatbed mounted, onto which a tree to be delimbed must be placed for processing. None describe or foreshadow a simple and efficient method and apparatus for delimbing based on a device that can be easily attached to heavy equipment (such as a skidder) and driven over a stack of felled timber for the purpose of delimbing same.

SUMMARY AND OBJECTS OF THE INVENTION

It is the purposes of this invention are to provide a delimbing method that is simple, safe and cost effective and a delimbing device that is simple in operation, rugged in construction, durable, safe to use, and cost-effective. These and other purposes described herein are accomplished by the provision of a device that can be removably attached to heavy equipment which is then driven over a stack of felled timber (parallel therewith) for the purpose of removing the limbs therefrom. The novel delimbing device taught herein features, in its preferred embodiments: (i) attachment means for removably attaching the device under (by way of example) the blade of a skidder, (ii) a rotating delimber having a rotatable linear horizontal axle on which are coaxially mounted, in spaced relationship to each other, a series of cutting discs, and (iii) connecting means between the attachment means and the rotating delimber. The novel delimbing method taught herein describes the steps by which such a device or one similar thereto can be used. First, by orienting such a device so that the rotatable linear horizontal axle is perpendicular to at least one felled tree. Second, by propelling said device over and along said at least one felled tree.

DETAILED DESCRIPTION OF THE PREFERRED EMBODIMENT

Figure 1:
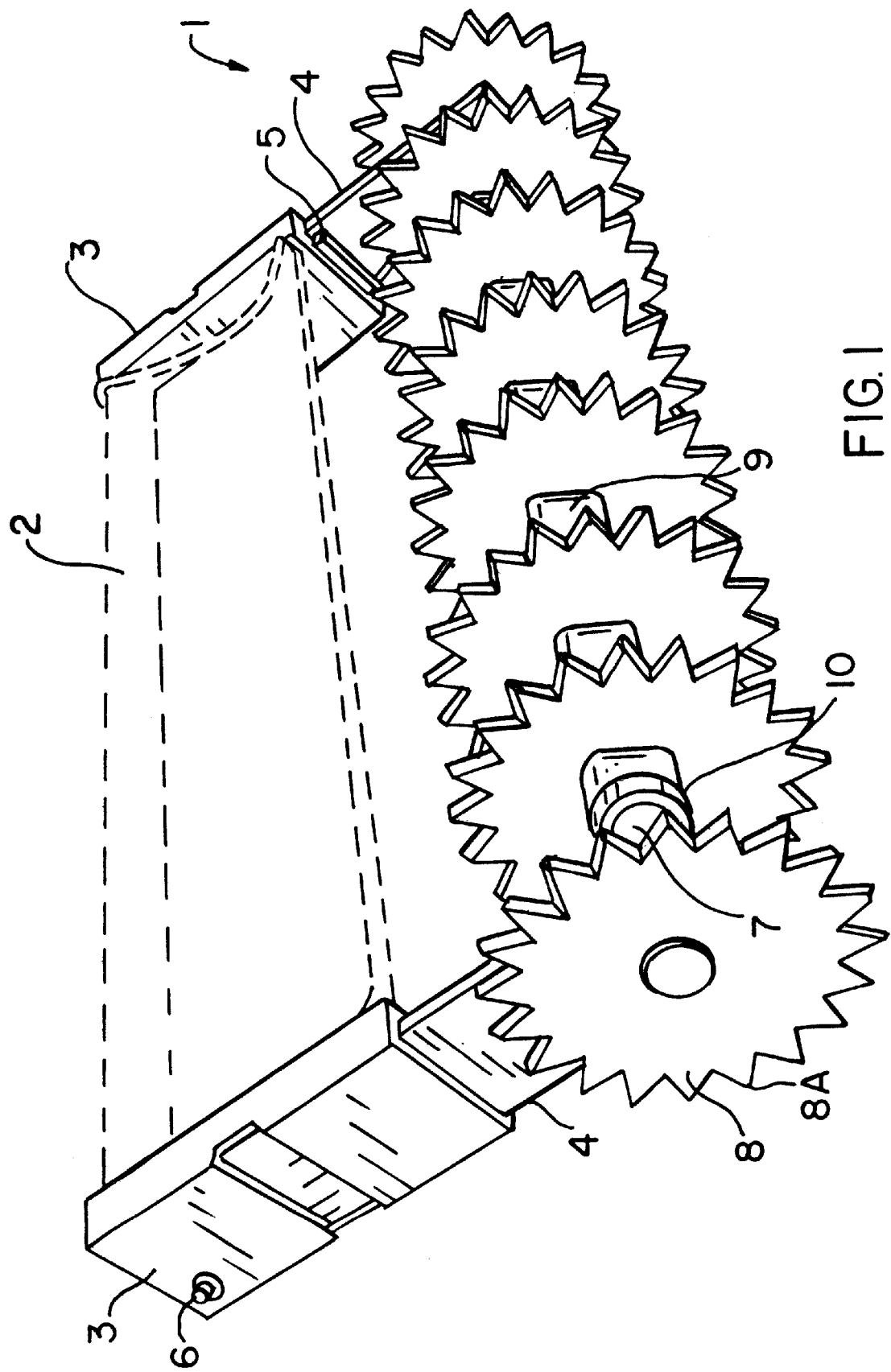
FIG. 1 provides a perspective view of the delimber taught herein positioned on the blade (which is shown for illustrative purposes only) of a piece of heavy equipment.
Figure 2:
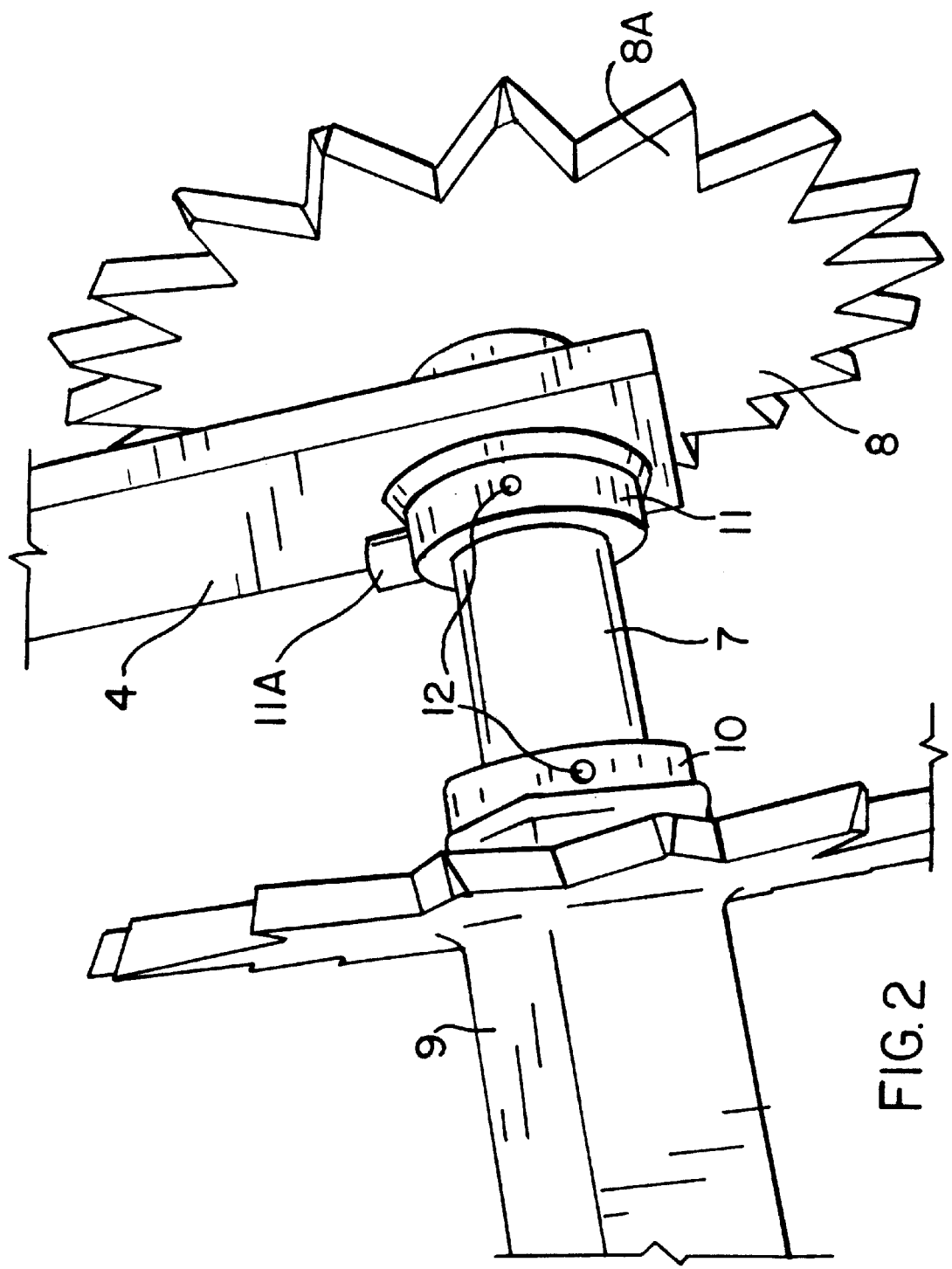
FIG. 2 provides a more close-up perspective view of one corner of the delimber taught herein.

As will be noted from review of FIGS. 1 and 2, the delimber (denoted generally by arrow 1) taught herein can be most advantageously used in conjunction with the moveable blade 2 (which is shown for illustrative purposes only) of an item of heavy equipment. This should not, however, be considered as a limitation in its use or in the convenience with which it may be utilized. It is capable of wide application, the example given being merely one of many possible. As illustrated, the delimber 1 possesses mounting boxes 3 which are attached to blade 2 in a more-or-less permanent fashion. Heavy-duty welding is advisable for this purpose, however, numerous other means familiar to those of ordinary skill in the mechanical arts may also be utilized. Arms 4 slide into mounting boxes 3 until stops 5 abut mounting boxes 3. Pins 6 are then utilized to nonpermanently secure the arms 4 in position. Arms 4 may advantageously extend approximately four and one half feet from mounting boxes 3. Shaft 7 (which in the embodiment illustrated is approximately seven feet long and has a four inch outside diameter) extends between the ends of arms 4 and is rotatably mounted thereon utilizing means well known in the mechanical arts. The cutting discs 8 (only one of which is denoted in each drawing figure to avoid overcrowding thereof) may be directly mounted on shaft 7 (as are the two discs 8 positioned to the outside of arms 4). However, it has been found that rectangular tubing 9 (which in the embodiment illustrated has a four inch interior diameter) may be advantageously mounted over shaft 7 and rigidly connected (via welding or some other means) thereto. The cutting discs 8 mounted between arms 4 (which take the brunt of operational forces when the delimber 1 is being utilized) are less likely to break free from rectangular tubing 9 while in operation due to its shape. Moreover, rectangular tubing 9 acts as reinforcement for (and to a certain extent, as a shock absorber for) shaft 7. Inner brass bushings 10 help to seal the interstices between shaft 7 and rectangular tubing 9 from debris. Outer brass bushings 11 with set screws 12 are provided to help maintain the position of the various components in spaced relationship, with outer brass bushings 11 being further provided with lubrication ports 11A. Discs 8 may be advantageously formed from ¾" plate steel with 3" teeth 8A (only one of which is denoted in each drawing figure to avoid overcrowding thereof) and an overall diameter of approximately twenty-four inches. In the embodiment illustrated, discs 8 are spaced approximately one foot apart. It has been found that the disc diameter and spacing specified is suitable for most commercial timber operations; however, these measurements (as well as other dimensions and materials specified herein) are subject to wide variation and may be altered to suit the needs of particular types/sizes of timber or timbering operations.

The delimber 1 described is simply and efficiently utilized. It can be easily attached to an item of heavy equipment using the means described in such manner that discs 8 roll along the ground when the delimber is driven in a direction perpendicular to shaft 7. It is then driven over a pile of cut timber (which should preferably be disposed in a roughly parallel configuration) starting at the base of the felled trees and moving toward the tips thereof. Discs 8 act almost like the tines of a comb, further straightening and organizing the stack in parallel alignment during this process. They also (in conjunction with shaft 7) act to snap off and/or cut off the limbs of the trees traversed as they roll forward. The process is then reversed and the delimber 1 is backed off the same way it came, duplicating and finishing the process. The time and labor savings over known manual processing methods are extraordinary. However, as should be obvious, numerous variations in the apparatus and process described may be made without exceeding the scope and ambit of the inventive concept, which should be interpreted in the light of the claims which follow.

I claim:

1. A tree delimber for attachment to a motive means adapted to move said tree delimber over felled trees, comprising:

(a) a generally linear horizontal member defining a horizontal axis;

(b) a plurality of vertical members depending from said horizontal member where at least one of said plurality of vertical members is a rotatable vertical member which is rotatable around an axis that is approximately parallel to said horizontal axis; and (c) attachment means for removably attaching said generally horizontal member to a motive means adapted to move said horizontal member with its dependent plurality of vertical members in a direction perpendicular to said horizontal axis over at least one felled tree.

2. A tree delimber, as described in claim 1, wherein said rotatable vertical member is planar and is perpendicular to said horizontal axis.

3. A tree delimber, as described in claim 1, wherein said rotatable vertical member is a planar disc and is perpendicular to said horizontal axis.

4. A tree delimber, as described in claim 1, wherein said generally linear horizontal member is rotatable around said horizontal axis and said rotatable vertical member is rigidly affixed thereto.

5. A tree delimber, as described in claim 2, wherein said generally linear horizontal member is rotatable around said horizontal axis and said rotatable vertical member is rigidly affixed thereto.

6. A tree delimber, as described in claim 3, wherein said generally linear horizontal member is rotatable around said horizontal axis and said rotatable vertical member is rigidly affixed thereto.

7. A method for delimbing trees, comprising the following steps:

(a) orienting a tree delimbing device having a generally linear horizontal member defining a horizontal axis and a plurality of vertical members depending from said horizontal member where at least one of said plurality of vertical members is a rotatable vertical member which is rotatable around an axis that is approximately parallel to said horizontal axis with at least one generally linear felled tree, which tree defines a linear axis, such that the linear axis of said generally linear felled tree is perpendicular to said horizontal axis; and (b) propelling said tree delimbing device parallel to said linear axis over said at least one generally linear felled tree.

8. A method for delimbing trees, as described in claim 7, wherein said tree delimbing device is propelled by pushing same parallel to said linear axis.

9. A method for delimbing trees, as described in claim 7, wherein said tree delimbing device is propelled by pulling same parallel to said linear axis.

10. A method for delimbing trees as described in claim 7, wherein said rotatable vertical member is planar and is perpendicular to said horizontal axis.

11. A method for delimbing trees as described in claim 10, wherein said rotatable vertical member is a planar disc.

12. A method for delimbing trees as described in claim 11, wherein said rotatable vertical member is rotatable around said horizontal axis.

13. A tree method for delimbing trees as described in claim 7, wherein the spacing between said plurality of vertical members is approximately one foot.

14. A tree delimber, as described in claim 1, wherein the spacing between said plurality of vertical members is approximately one foot.

15. A method for delimbing trees as described in claim 12, wherein the diameter of said rotatable vertical member is approximately 24 inches.

16. A tree delimber, as described in claim 3, wherein the diameter of said rotatable vertical member is approximately 24 inches.

17. A method for delimbing trees as described in claim 7, wherein said tree delimbing device is propelled by means of its attachment to a mechanical propulsion means.

* * * * *